Oct. 7, 1947.  G. C. WICKS  2,428,445
SELF-ADJUSTING UNIT FOR THE ELECTRIC HEATING OF LIQUIDS
Filed Sept. 12, 1945  3 Sheets-Sheet 1
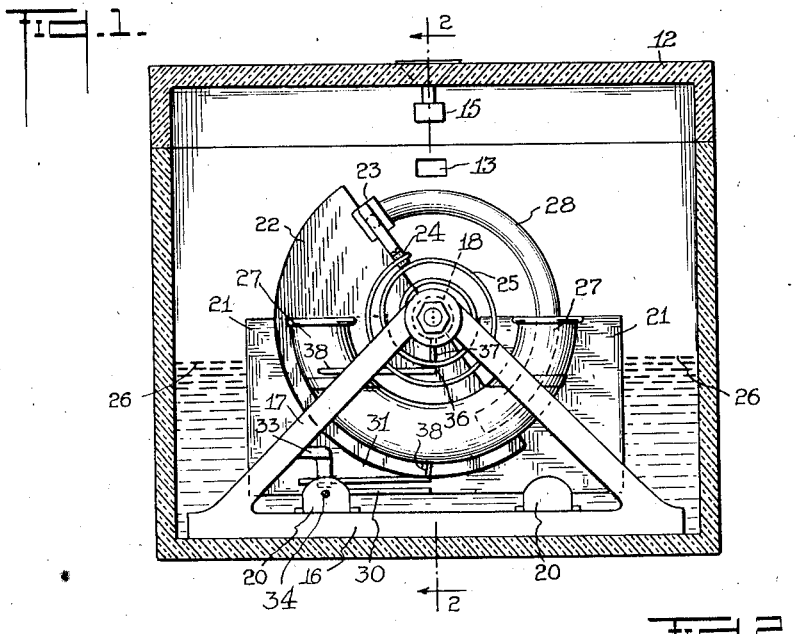
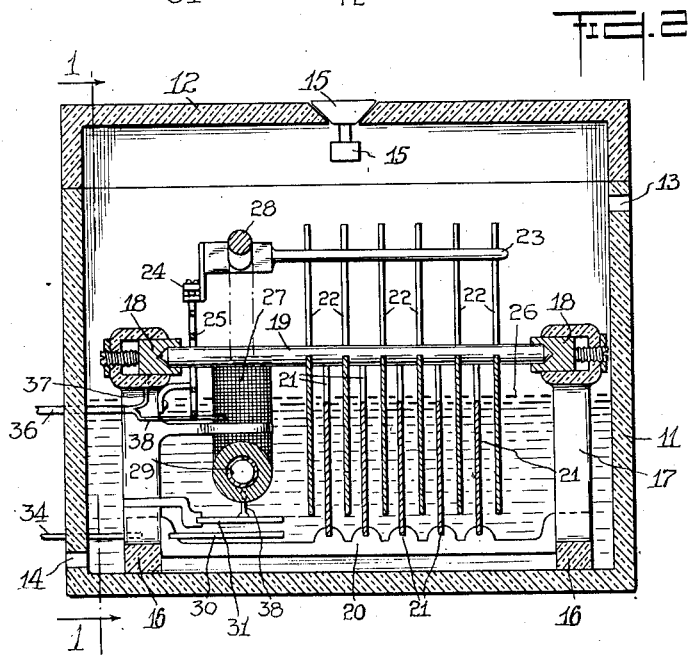
GERALD CYRO WICKS
INVENTOR
BY
ATTORNEY Oct. 7, 1947.   G. C. WICKS   2,428,445
SELF ADJUSTING UNIT FOR THE ELECTRIC HEATING OF LIQUIDS
Filed Sept. 12, 1945   3 Sheets-Sheet 2
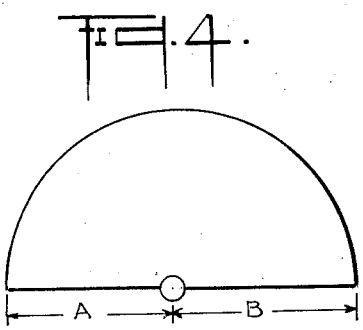
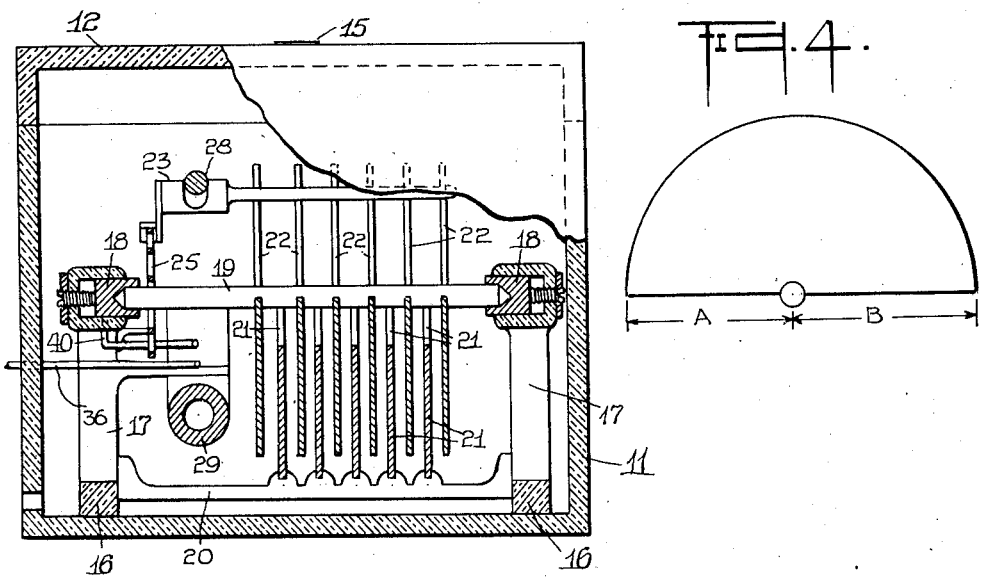
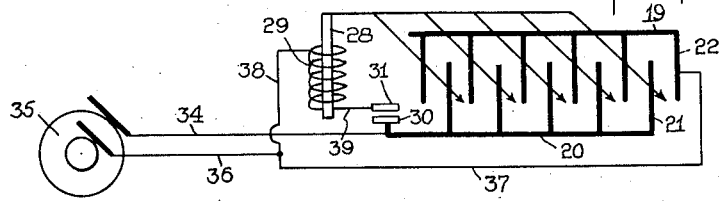
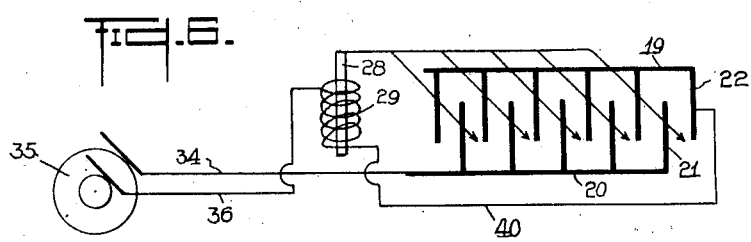
GERALD CYRO WICKS
INVENTOR
BY *(signature)*
*his* ATTORNEY Oct. 7, 1947.                    G. C. WICKS                    2,428,445
           SELF ADJUSTING UNIT FOR THE ELECTRIC HEATING OF LIQUIDS
                    Filed Sept. 12, 1945          3 Sheets-Sheet 3
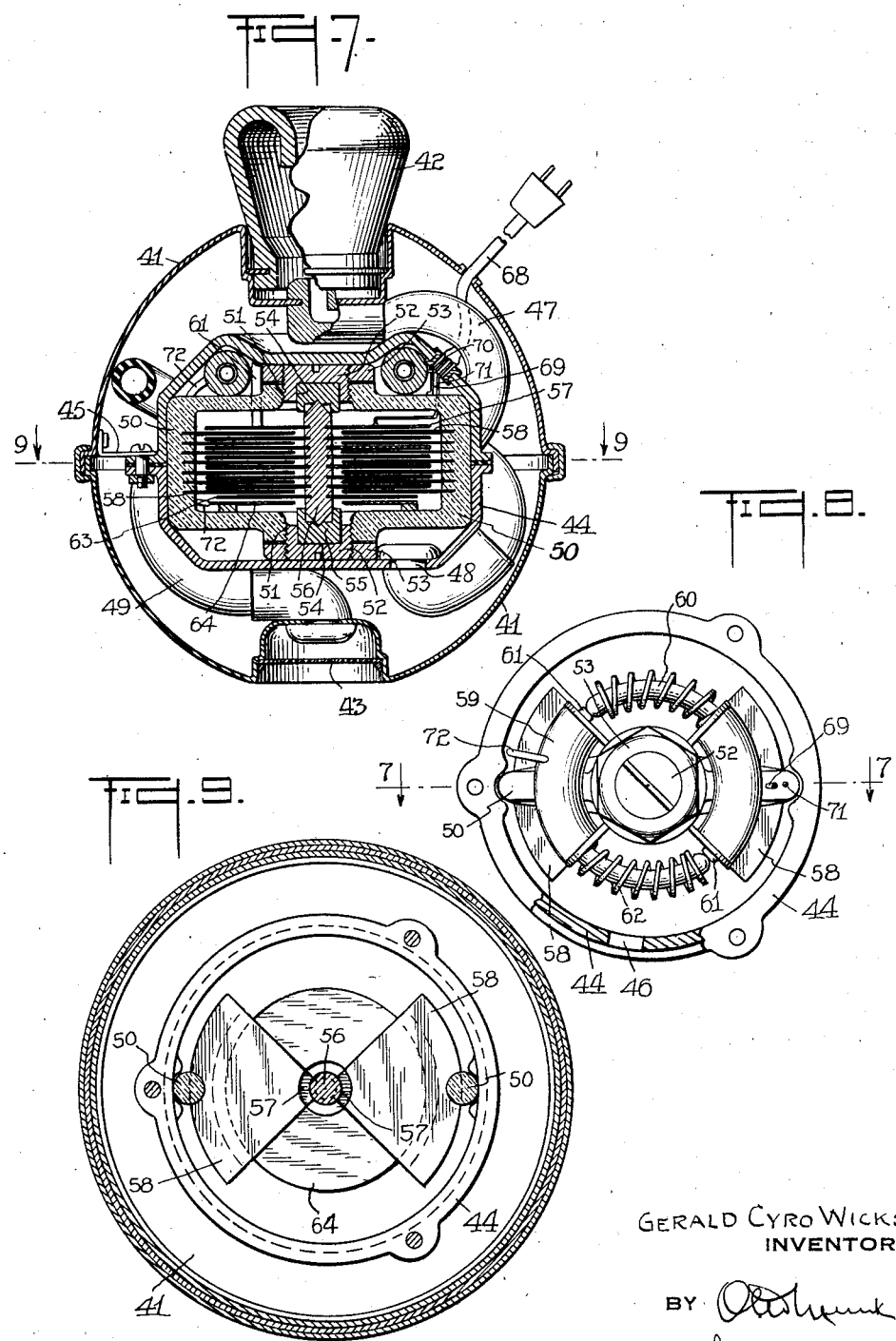
GERALD CYRO WICKS
INVENTOR Patented Oct. 7, 1947

2,428,445

UNITED STATES PATENT OFFICE 2,428,445

SELF-ADJUSTING UNIT FOR THE ELECTRIC HEATING OF LIQUIDS

Gerald Cyro Wicks, Buenos Aires, Argentina

Application September 12, 1945, Serial No. 615,779

12 Claims. (Cl. 219—40)

1

The present invention relates to a heating unit for heating liquids by passing an electric current directly through the liquid to be heated and generating heat in the liquid due to the resistance offered by the liquid to the flow of current. One object of the invention is to provide a heating unit which can be used for the heating of liquids having widely different electro-conductivities such as water having different degrees of hardness, by means of a current passing directly through the liquid without danger to the fuses and conduits in the supply circuit on account of currents of excessive magnitude.

Another object of the invention is to provide a heating unit for heating liquids by passing a current directly through the liquid to be heated in which variations of the current due to differences in the conductivity of the liquid to be heated are greatly reduced or even completely eliminated.

A further object of the invention is to provide a self-adjusting heating unit of the type described in which the electrodes connected to the opposite terminals of a source of current are automatically adjusted relative to each other so as to keep the current practically constant regardless of the conductivity of the liquid to be heated.

A still further object of the invention is to provide a heating unit for heating liquids of different conductivities, such as for instance water having different degrees of softness, which adjusts itself automatically in function of the conductivity of the liquid to be heated to prevent the flow of currents of excessive magnitude in the circuit to which the unit is connected.

Still another object of the invention is to provide a heating unit for heating liquids by passing an electric current directly through the liquid to be heated in which the current is maintained practically constant regardless of changes in the conductivity of the liquid to be heated due to the rise in the temperature of the liquid.

A specific object of the invention is to provide a heating unit for liquids having a stationary set of electrodes and a cooperating movable set of electrodes in which the movable electrodes are displaced by electromagnetic means energized in a circuit closed through the liquid to be heated.

These and other objects, which will appear more clearly as the specification proceeds, are accomplished, according to the present invention, by the arrangement and combination of parts set forth in the following detailed description, defined in the appended claims and illustratively exemplified by the accompanying drawings in which:

Fig. 1 is a sectional view of a water heater according to the invention in an intermediate adjusted position, the section being taken on line 1—1 of Fig. 2.

2

Fig. 2 is a cross-section of the heater taken on line 2—2 of Fig. 1.

Fig. 3 is a wiring diagram for the heater unit shown in Figs. 1 and 2.

Fig. 4 is an elevational view of a modified rotatable electrode plate for use in a heater according to Figs. 1 to 3.

Fig. 5 is a sectional view, similar to that of Fig. 2, of a modified embodiment of the invention.

Fig. 6 is a wiring diagram for the heater unit according to Fig. 5.

Fig. 7 is an axial section of a hot water dispenser to be attached to a cold water faucet and including a heating unit according to another modification of the present invention.

Fig. 8 is a top plan view of the heating unit according to Fig. 7 seated in the water container, with some parts broken away to show details and Fig. 9 is a cross-section through Fig. 7 taken on line 9—9.

The same reference numerals designate corresponding parts in the various figures of the drawing.

Referring now to the drawing, and first to Figs. 1 to 3, 11 denotes a substantially rectangular container made for instance of an insulating material such as a ceramic cement or the like. The container 11 is closed by a cover 12 of the same material. The container 11 is provided near the top of one of its end walls with a water inlet port 13 and near the bottom of the opposite end wall with a water outlet port 14. A steam safety valve 15 is arranged centrally in the cover 12.

The heating unit according to the invention is shown as resting on the bottom of the container 11 and comprises a frame 16 of insulating material including, at its opposite ends, two upstanding brackets 17. Two aligned bearings 18 are adjustably mounted in the upper portions of the two brackets 17, respectively, and support between them a rotary shaft 19. Two conductor bars 20 are supported on the lower part of the frame 16 and carry a set of parallel, mutually spaced electrode plates 21 extending at right angles to the conductor bars 20 and shaft 19 and having, in the illustrated embodiment, a substantially rectangular shape with a semicircular recess at the center of their top edges to clear the shaft 19. The plates 21 are set in bosses formed on the conductor bars 20 and are conductively connected with the latter. A second set of mutually spaced, parallel electrode plates 22 of substantially semicircular outline is mounted electroconductively on the shaft 19 in such a manner that, in the angular position of the shaft 19 in which the plates 22 assume their lowermost positions, each electrode plate 21 is disposed between and equidistantly spaced from two plates 22. A cross bar 23 connected to all the electrode plates 22 at corresponding eccentric points of their straight edges carries at one end a screw clamp 24. The outer end of a spiral spring 25 of increasing diameter, arranged concentrically about and spaced from the shaft 19, is adjustably held in said screw clamp 24, while the inner end of the spring 25 is fixedly secured to one of the frame brackets 17. The spiral spring 25 tends to turn the plates 22 and shaft 19 in counterclockwise direction (as seen in Fig. 1) to the position in which the plates 22 register completely with the plates 21. In this position, when the two sets of plates are connected to opposite terminals of a source of current and the container 11 is filled with water, for instance up to the level 26, the current flowing through the water filling the spaces between the electrode plates 21 and the electrode plates 22 is maximum. If, however, the shaft 19 and plates 22 are turned in a clockwise direction through the position shown in the drawing, the current is gradually decreased toward minimum and reaches zero when the shaft has been turned through 180° and the plates 22 have been completely withdrawn from the plates 21.

Such an adjustment of the shaft 19 and plates 22 is effected automatically in function of the conductivity of the water to be heated by the following arrangement. A semicircular solenoid 27 is supported on a bracket 17 of the frame 16 concentrically with the shaft 19 and below the horizontal plane through the axis of said shaft. The solenoid 27 has a semi-circular armature plunger 28 connected with its free end to the cross bar 23 and urged to move in a counterclockwise direction, as seen in Fig. 1, by the spiral spring 25 acting on said cross bar 23. When the coil 29 of the solenoid 27 is excited by a current of a predetermined value, the magnetic power of the solenoid overcomes the force of the spring 25 and the armature plunger 28, cross bar 23, plates 22 and shaft 19 are all turned in clockwise direction (as seen in Fig. 1) through an angle which depends on the excess value of the current supplied to the solenoid 27.

In the embodiment of the invention shown in Figs. 1 to 3, the energizing circuit for the solenoid 27 comprises two additional stationary control electrodes 30 and 31 of comparatively small size and arranged in two horizontal spaced apart planes one above the other, near the bottom of the container 11 and below the lowest level touched by the peripheries of the movable electrode plates 22 when they are turned to their position in which they register completely with the plates 21. Thus, when the container 11 is filled with water, current will flow across the space between the control electrodes 30, 31 before any current flows across the spaces between the stationary electrodes 21 and the movable electrodes 22. The control electrode 30 is electroconductively supported on one of the conductor bars 20, while the electrode 31 is carried by a projection 33 formed on one of the brackets 17. The electrical connections, as shown most clearly in the circuit diagram of Fig. 3 are as follows; a lead in wire 34 connects one terminal of a source of current, e. g. of an A. C. generator 35, to one of the conductor bars 20. A second wire 36, connected to the other terminal of the source of current 35, has two branches 37 and 38. The branch 37 supplies current to one of the bearings 18 and, hence, to the shaft 19 and in parallel to all the plates 22 mounted on said shaft. The branch 38 of wire 36 is connected to one end of the solenoid coil 29. The other end of the solenoid coil 29 is connected to the control electrode 31 by means of a conductor 39. Thus, the stationary control electrode 31 and the solenoid coil 29 are connected in series with each other and in parallel to the movable electrode plates 22 to the same terminal of the generator 35 as the latter.

The device illustrated in Figs. 1 to 3 operates as follows:

If a soft water having a comparatively high ohmic resistance is to be heated and is, for this purpose, introduced into the container 11, a current will start flowing in the coil 29 of the solenoid 27, as soon as the water fills the space between the electrodes 30 and 31. However, due to the low conductivity of the conductor formed by the water between the control electrodes 30 and 31, the current through the solenoid will be relatively weak and the magnetic force induced will be insufficient to overcome the force of the spring 25. The plunger 28, bar 23 and shaft 29 will, thus, remain in the position in which the plates 22 register completely with the stationary plates 21, and as the spaces between these movable and stationary heating plates are gradually filled with water, a heating current will flow through the water, the total magnitude of which is below the permissible limit for the supply circuit.

If, however, a hard water of comparatively low ohmic resistance is to be heated, the current flowing across the control electrodes 30 and 31 as soon as the level of the water in the container 11 reaches the electrode 31, exceeds the predetermined current value beyond which the energization of the solenoid overcomes the power of the spring 25 and the armature plunger 28 is displaced in clockwise direction, as seen in Fig. 1. This causes the plates 22 and shaft 19 to rotate in the same direction, thus withdrawing the plates 22 from the plates 21 in exact proportion to the excess current flowing across the control electrodes 30, 31. Thus, when the rising water begins to fill the spaces between the stationary electrodes 21 and the movable electrodes 22, the latter have already been adjusted to a position in which the cross-section of the conductors formed by the water in the spaces between the fixed and the movable plates is sufficiently reduced to limit the current flowing between these plates in function of the conductivity of the water to be heated. Thus, the device according to the invention, adjusts itself automatically to the conductivity of the water to be heated and maintains the total current in the circuit practically constant. The slight inaccuracy which results from the fact that the current flow across the small control electrodes is not modified by the adjustment is in most cases of minor practical importance, but, if desired, it may be compensated for by the use of a suitably graduated spring 25 or of movable plates the diameter of which decreases along a helical line in the direction opposite to that of their withdrawal from the stationary plates in proportion to the fraction of the total current passed by the control electrodes 30, 31. A modified plate of this type calculated for an arrangement in which, in the initial position of the movable plates, about 5% of the total current flows across the control electrodes 30, 31 is shown in Fig. 4, in which A <B.

An adjustment similar to that described above for liquids having different coefficients of conductivity at the same temperature, occurs in the device according to the invention when the conductivity of the heated liquid changes during the heating due to the rise in the temperature of the liquid.

The modification of the invention illustrated in Figs. 4 and 5, differs from the embodiment shown in Figs. 1 to 3, in that the control electrodes 30 and 31 and the lead wires 37, 38 and 39 are omitted, and one end of the solenoid coil 29 is directly connected to the wire 36 while its other end is connected by a wire 40 to a bushing 18, and thus, over the shaft 19, in parallel to all the electrode plates 22. In this case, the total current of the heating circuit acts on the solenoid, which operates as soon as said total current exceeds a predetermined value. However, since, upon operation of the solenoid, this total current is automatically reduced, the displacement of the movable electrodes will stop when the excess current has been reduced by approximately one half.

In Figs. 7 to 9, 41 is a two-part outer metal shell formed with an inlet opening at the top and an outlet opening at the bottom. A rubber mouthpiece 42 mounted in the inlet opening serves to attach the device to a cold water faucet and a strainer 43 set in the outlet opening distributes the hot water discharged from the heater. A water container 44 made in two parts from heat resistant glass is supported in the shell 41 by means of brackets 45 and has an inlet port 46 connected to the inlet opening and the mouthpiece 42 by means of a rubber tube 47 and an outlet port 48 connected to the outlet opening of the shell 41 by means of a rubber tube 49.

A substantially rectangular metal frame 50 is seated in the container 44 and provided with aligned threaded bores 51 in central enlargements of its horizontal bars. The bores 51 are closed by screws 52 secured in position by nuts 53 and provided at their inner ends with cylindrical recesses 54. Two heat resistant glass bearings 55 are seated in the two recesses 54, respectively, and hold between them a vertical metal shaft 56. Two sets of vertically spaced horizontal electrode plates 57, each having an outline corresponding to that of a 90° sector of a circle, are mounted on the shaft 56 in diametrically opposed positions so as to be electroconductively connected with the shaft and, through the shaft, with each other while their peripheral edges are spaced from the horizontal bars of the frame 50. Two similar sets of fixed horizontal electrode plates 58 corresponding in their outlines to 90° sectors of a greater circle are mounted with their peripheral edges in the vertical bars of the frame 50 in alternating spaced relationship relative to the rotatable plates 57. The fixed plates 58 are recessed at their inner tips to clear the shaft 56.

Two oppositely arranged arc-shaped solenoids 59, each extending through an angle of 90° are mounted on top of the frame 50 concentrically with the shaft 56 so as to balance the device regardless of its position. Their arc-shaped armature plungers 60 extend in their most projected positions over the two remaining 90° arcs of the complete circle. The free end of each armature plunger 60 is connected by means of a vertical bar 61 to a straight edge of one of the two uppermost movable electrode plates 57, so that when the solenoids 59 are energized and their armatures attracted the movable plates 57 are displaced from their positions shown in the drawing, in which they are in complete alignment with the fixed plates 58, toward a position in which they are more or less withdrawn from the spaces between the fixed plates in dependence upon the energization of the solenoids 59. The armature plungers 60, plates 57 and shaft 56 are normally held in the position shown in the drawing, in which the movable plates 57 register completely with the fixed plates 58, by means of compression springs 62 surrounding the plungers.

The coils of the two solenoids 59 are electrically connected in series and energized over two control electrodes 63, 64. The control electrode 63 includes two sector shaped plates similar to the movable plates 57, but of a smaller radius and is mounted on the shaft 56 below the lowermost fixed electrode plate 58. The second control electrode 64 is a complete circular annulus of a diameter corresponding to that of electrode 63 and is supported on the lower horizontal bars of the frame 50 by means of insulating blocks 66.

A two wire cable 68 passes through the shell 41 and into the container 44. One branch 69 of one of the two wires is connected to the frame 50 and its other branch 70 is connected to the free end of the coil of one of the solenoids 59. The other wire 71 which is flexible and insulated over the greatest part of its length, is soldered to the upper surface of the uppermost movable plate 57 near the shaft 56. The free end of the coil of the second solenoid 59 is connected by means of a conductor 72 to one of the stationary control electrodes 64.

The device operates substantially like that described in connection with Figs. 1 to 3. When water is admitted to the container 44, current will flow across the control electrodes 63, 64 as soon as the water fills the space between these electrodes in a circuit including wire 71, uppermost plate 57, shaft 56, control electrode 63, water, control electrode plates 64, wire 72, coils of the two solenoids 59 in series and branch wire 70. If the ohmic resistance of the water in this circuit is high, the current through the coils of the solenoids 59 will be insufficient to overcome the force of the spring 62 and the plates 57 will remain in their positions shown in the drawing, in complete register with plates 58. If, however, the ohmic resistance of the water in the control circuit happens to be low, the current through the solenoid coils will be sufficient to displace the armature plungers 60, plates 57 and shaft 56 in clockwise direction, as seen in Figs. 8 and 9, through an angle which is proportional to the excess current flowing in the control circuit. Thus, the plates 57 will be moved more or less out of register with the plates 58 and the resistance of the heating circuit including the wire 71, plates 57 connected in parallel through shaft 56, water, plates 58 connected in parallel through frame 50, and branch wire 69, will be increased in function of the conductivity of the water. Due to the fact that the control electrode 64 has the form of a complete circular disc, the cross-section and length of the current flow path through the water filling the space between the control electrodes 63 and 64 is constant regardless of the rotary movement carried out by the shaft 56 and electrode 63, and the adjustment of the movable electrodes has no effect on the magnitude of the current flowing in the control circuit.

Although with reference to the drawing, the device according to the invention has been described as an electric water heater, it is obvious that it can be used with equally good effects for the heating of electro-conductive liquids other than water, such as salt solutions, organic or in-

I claim:

1. In combination with a container adapted to receive an electroconductive liquid to be heated, a heating unit in said container comprising a pair of spaced electrodes, means to connect said electrodes to opposite terminals, respectively, of a source of current, at least one of said electrodes being displaceable relative to the other electrode from a normal first position in which the current flowing through the liquid to be heated between said electrodes is a maximum towards a second position in which said current is a minimum, a pair of mutually spaced control electrodes in said container shaped and arranged to provide a current flow path of constant cross section and length through a liquid filling the space between them, circuit branches for connecting said control electrodes to the opposite terminals of the source of current in parallel with the electrodes of said heating unit, and electromagnetic means connected for energization in a circuit including said pair of control electrodes for shifting said displaceable electrode from said first position towards said second position in function of the conductivity of the liquid to be heated.

2. In combination with a container adapted to receive an electroconductive liquid to be heated, a heating unit comprising a first electrode set in said container including a plurality of mutually spaced, parallel electrode plates, means for connecting said electrode plates of said first set in parallel to one terminal of a source of current, a second electrode set in said container including a plurality of electrode plates disposed parallel to and in alternating spaced relationship to the electrode plates of said first set, means for connecting the electrode plates of said second set in parallel to the opposite terminal of the source of current, said second electrode set being movable relative to said first electrode set from a first position in which the current flowing through the liquid to be heated between the adjacent electrode plates of said two electrode sets is a maximum towards a second position in which said current is a minimum, means urging said second electrode set towards said first position, two mutually spaced control electrodes shaped and arranged to provide a current flow path of constant cross-section and length through a liquid filling the space between them, circuit branches for connecting said two control electrodes to the opposite terminals of the source of current in parallel with the electrode plates of said two sets, respectively, and means including a solenoid for shifting said second electrode set from said first towards said second position, said solenoid having an armature operatively connected with said second electrode set and a coil inserted in series in one of the circuit branches connecting a control electrode with a terminal of the source of current.

3. A heating unit, as claimed in claim 1, in which said control electrodes are shaped and arranged to provide through a liquid filling the space between them a current flow path having an ohmic resistance which is high as compared with the maximum ohmic resistance through a liquid filling the space between the electrodes of said heating unit.

4. A heating unit, as claimed in claim 1, in which said control electrodes are disposed below the lowermost level of the spaces between said electrodes forming said heating unit.

5. A heating unit, as claimed in claim 1, in which said control electrodes include horizontal plates disposed above one another below the lowermost level of the spaces between said electrodes forming said heating unit.

6. A heating unit, as claimed in claim 2, in which said means for urging said second electrode set towards said first position includes a spring graduated to compensate for the inaccuracy resulting from the current traversing the constant current flow path between the control electrodes.

7. A heating unit, as claimed in claim 2, in which said movable electrode plates are displaced in planes parallel to said stationary electrode plates and their surfaces decrease towards their ends withdrawn last from register with said stationary plates when said second electrode set is displaced from said first toward said second position to compensate for the inaccuracy resulting from current traversing the constant current flow path between the control electrodes.

8. A heating unit for heating liquid by the direct passage of an electric current therethrough, comprising a frame, a first set of stationary, mutually spaced, parallel electrode plates mounted in said frame, means to connect the electrode plates of said first set in parallel to one terminal of a source of current, a rotatable shaft supported in said frame and extending transversely of all the electrode plates of said first set, a second set of mutually spaced electrode plates mounted eccentrically on said rotatable shaft parallel and in alternating spaced relationship to the electrode plates of said first set, means for connecting the electrode plates of said second set in parallel to the opposite terminal of the source of current, said second electrode set being movable, upon rotation of said shaft, from a first position in which at least a major portion of each electrode plate of said second set is disposed adjacent to and in register with the corresponding stationary electrode plate of said first set towards a second position in which at most a small portion of each electrode plate of said second set is disposed adjacent to and in register with the corresponding stationary electrode plate of said first set, a spring acting between said frame and said movable electrode set to urge the latter towards said first position, solenoid mounted in said frame and having an armature plunger, means connecting said armature plunger operatively with said second electrode set for displacement of the latter, upon an energization of said solenoid sufficient to overcome the force of said spring, from said first position towards said second position through an angle which is proportional to the magnitude of the excess current supplied to said solenoid, two control electrodes shaped and arranged to provide a current flow path of constant cross section and length through a liquid filling the space between them, and means to connect said control electrodes to the opposite terminals of the source of current in shunt with the electrode plates of said two electrode sets, respectively, the coil of said solenoid being connected to one terminal of the source of current in shunt with the electrode plates of one of said sets and in series with the corresponding control electrodes.

9. A heating unit, as claimed in claim 8, in which said movable electrode plates have a straight edge intersecting the axis of said rotatable shaft, and a helically curved edge connecting the two ends of said straight edge so that the diameter of the movable plates decreases towards the end thereof last withdrawn from register with said stationary plates as said shaft rotates from said first towards said second position to compensate for the inaccuracy resulting from the current traversing the constant current flow path between the control electrodes.

10. A heating unit, as claimed in claim 8, in which said control electrodes are stationarily supported on said frame at a fixed distance from each other.

11. A heating unit, as claimed in claim 8, in which one of said control electrodes is mounted on said shaft and the other control electrode is supported on said frame adjacent to and spaced from said first control electrode, one of said two control electrodes having the shape of a complete circular annulus arranged coaxially with respect to said shaft.

12. A heating unit, as claimed in claim 8, in which said solenoid is of arcuate shape and is mounted in said frame concentrically with said shaft carrying said movable electrode plates, said arcuate solenoid having an arcuate armature plunger, the free end of which is operatively connected with said second electrode set for displacement of the latter.

GERALD CYRO WICKS.

REFERENCES CITED

The following references are of record in the file of this patent:

UNITED STATES PATENTS

| Number | Name | Date |
|---|---|---|
| 1,424,340 | Cavitt | Aug. 1, 1922 |
| 1,023,602 | Wallmann | Apr. 16, 1912 |
| 1,706,146 | Davidsen | Mar. 19, 1929 |

FOREIGN PATENTS

| Number | Country | Date |
|---|---|---|
| 324,087 | Germany | Aug. 17, 1920 |